United States Patent [19]
Bauer et al.

[11] 4,213,790
[45] Jul. 22, 1980

[54] PROCESS FOR THE PRODUCTION OF CEMENT IN A FLUIDIZED BED

[75] Inventors: Klaus Bauer, Oelde; Wolf Goldmann, Beckum; Horst Kretzer, Beckum; Heinrich Weber, Beckum; Rüdiger Beyer, Bad Waldliesborn; Wilfried Kreft, Ennigerloh; Frank Schaberg; Rudolf Weber, both of Oelde; Herbert Schmelter, Ennigerloh; Horst Ritzmann, Enniger; Erich Schnieder, Ahlen; Georg Schepers, Ennigerloh, all of Fed. Rep. of Germany

[73] Assignee: Polysius AG, Beckum, Fed. Rep. of Germany

[21] Appl. No.: 927,366

[22] Filed: Jul. 24, 1978

[30] Foreign Application Priority Data

Aug. 4, 1977 [DE] Fed. Rep. of Germany ....... 2735084
Aug. 4, 1977 [DE] Fed. Rep. of Germany ....... 2735140
May 23, 1978 [DE] Fed. Rep. of Germany ....... 2822377
May 23, 1978 [DE] Fed. Rep. of Germany ....... 2822395
May 23, 1978 [DE] Fed. Rep. of Germany ....... 2822419

[51] Int. Cl.$^2$ ............................................. C04B 7/44
[52] U.S. Cl. ..................................................... 106/100
[58] Field of Search ......................................... 106/100

[56] References Cited

U.S. PATENT DOCUMENTS 2,409,707  10/1946  Roetheli ............................. 106/100

Primary Examiner—James Poer
Attorney, Agent, or Firm—Learman & McCulloch

[57] ABSTRACT

A process for producing cement wherein preheated, partially calcined powder-form raw material is finally calcined in a fluidized bed and is discharged to a cooler through which a cooling stream of air passes. A part of the cooling air passes into the fluidized bed from below and another part of the cooling air, together with the partially calcined material, passes into the fluidized bed from the side. The rates of material flow to and from the fluidized bed is regulated to maintain a substantially uniform intersticial ratio between the upper and lower regions of the fluidized bed.

17 Claims, 1 Drawing Figure

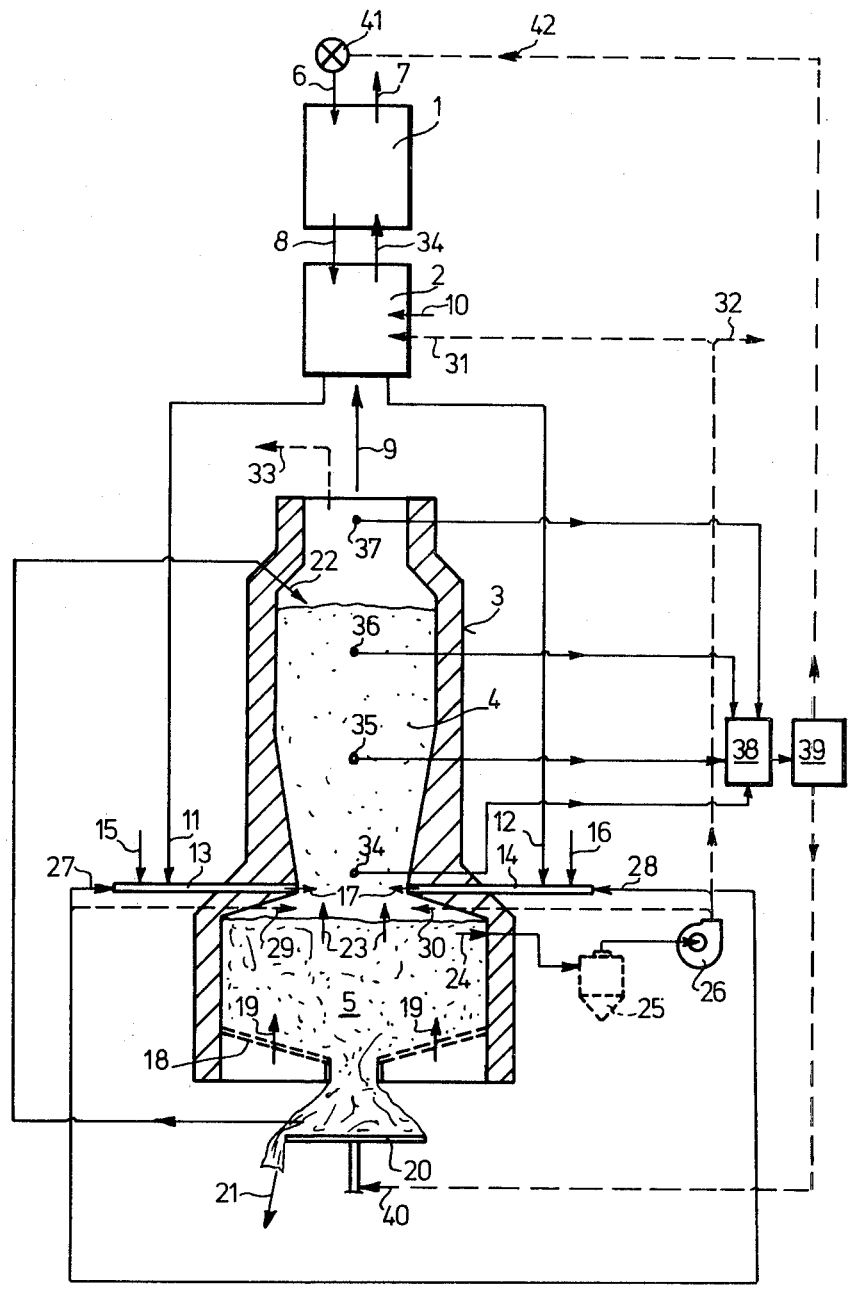

PROCESS FOR THE PRODUCTION OF CEMENT IN A FLUIDIZED BED

This invention relates to a process for the production of cement by calcining powder-form raw material in a fluidised bed into which preheated raw material, fuel, preheated air and a recycled fraction of the calcined material are introduced, the material discharged from the fluidised bed subsequently being cooled by a stream of cooling air in a cooling zone.

It is known that granulated cement raw material can be calcined in a fluidised bed ("Zement-Kalk-Gips", 1970, pages 343 to 347 and German Auslegeschrift No. 1,433,913). Disadvantages of this process are the expense involved in granulating the raw material and the lack of uniformity in the heat treatment of the inner and outer material zones of the granules.

In order to obviate these disadvantages, attempts have also been made to calcine powder-form cement raw material in a fluidised bed (German Auslegeschrift No. 1,156,012; German Offenlegungsschrift No. 1,696,690 and "Zement-Kalk-Gips", 1971, pages 571 to 573). In this case, a recycled fraction of the calcined material is introduced into the fluidised bed as so-called "seed clinker" in addition to powder-form raw material, fuel, combustion and aerating air, so that continuous growth of the clinker particles is obtained in the fluidised bed by accumulation of the raw mix. Both the raw material and the air are preheated before introduction into the fluidised bed. The calcined clinker is removed from the fluidised bed through an overflow or a central outlet and is cooled in a separate cooler.

Considerable difficulties arose in the practical application of this process which, hitherto, have prevented it from being carried out on a commercial scale. Thus, it was frequently found to be difficult to distribute the preheated raw material and the fuel quickly and uniformly in the fluidised bed and satisfactorily to stabilise the fluidised bed in operation. This is because the particle band present gives rise to a certain separation effect in the fluidised bed which in turn produces a downwardly decreasing intersticial ratio (the intersticial ratio is the ratio of the empty volume to the total volume of a fluidised bed).

Another problem encountered in the known process is the considerable evaporation of alkali which accompanies calcination in the fluidised bed. In the case of raw materials of high alkali content, this gives rise to an extremely high alkali content in the exhaust gases of the fluidised bed which, in many cases, prevents these exhaust gases from being used for preheating the raw material and, hence, leads to an undesirably high heat demand.

Accordingly, the object of the present invention is to obviate these disadvantages by providing a process and apparatus for calcining powder-form cement raw material in a fluidised bed which is distinguished by particularly stable operations of the fluidised bed, by a very uniformly calcined end product and by a comparatively low heat demand and which also enables cement clinker having a particularly low alkali content to be produced.

According to the invention, this object is achieved by the following combination of features:

(a) before introduction into the fluidised bed, the preheated raw material is precalcined with additional fuel in a precalcination zone to a deacidification level of at least 40% and preferably from 80 to 95%;

(b) from the lower region of the fluidised bed, the calcined material passes downwards into an immediately adjacent packed bed of material forming the cooling zone;

(c) part of the cooling air stream is introduced into the fluidised bed from below and another part from the side.

According to the invention, the raw material is largely deacidified (precalcination, i.e, removal of $CO_2$) before it is introduced into the fluidised bed. In this way, the fluidised bed is relieved of a large part of the thermal work which it would otherwise have to perform. This affords considerable advantages in that the fluidised bed may be made smaller and requires only a relatively small supply of fuel and gives off less exhaust. By virtue of the considerable reduction in the amount of exhaust given off from the fluidised bed, it is possible, in cases where the raw material used has a particularly high alkali content, completely or partly to dispense with the use of the exhaust gases for preheating and precalcining the raw material without at the same time significantly increasing the heat demand.

By virtue of the fact that, according to the invention, part of the cooling air stream is introduced into the fluidised bed from below and another part from the side, the precalcined material and fuel are distributed quickly and uniformly in the fluidised bed, so that particularly uniform heat treatment of the material and highly stable operation of the fluidised bed are obtained.

In addition, the considerable improvement in the calcination conditions prevailing in the fluidised bed attributable to the high degree of precalcination and to the rapid, uniform distribution of the precalcined material and the fuel in the fluidised bed provides for effective operation of the cooling zone situated immediately below the fluidised bed and, in particular, prevents disturbances in operation caused by the agglomeration of material in the cooling zone. Accordingly, the process according to the invention provides very uniformly calcined spherical clinker particles of substantially uniform particle size.

The rapid and uniform distribution of the precalcined material in the fluidised bed may be further promoted by introducing the precalcined material into the fluidised bed from the side through part of the cooling air stream, preferably with a very strong impulse of from 5 to 10 kps.

By a reduction in cross-section, it is possible with advantage to adjust in the lower region of the fluidised bed intended for the introduction of the precalcined material substantially the same intersticial ratio as in the upper region of the fluidised bed, best an intersticial ratio of from 0.5 to 0.8 and preferably from 0.6 to 0.7. This measure provides for particularly uniform distribution of the precalcined material in the fluidised bed, even when the point at which the material is introduced is situated at a very low level, i.e., just above the cooling zone.

At least part of the fuel is best introduced into the fluidised bed from the side below the surface of the fluidised bed, preferably at substantially the same level at which the precalcined material is introduced. Another part of the fuel may be introduced into the fluidised bed through the surface thereof or together with the recycled fraction of the calcined material.

That part of the fuel which is pneumatically introduced into the fluidised bed from the side is preferably introduced into the fluidised bed together with the precalcined material, advantageously at several points uniformly distributed over the circumference of the fluidised bed. In this way, the material and the fuel are distributed particularly rapidly and uniformly in the fluidised bed.

In addition, to obtain stable operation of the fluidised bed, it is important for the particular quantity of material present in the fluidised bed to be kept substantially constant irrespective of fluctuations in the quantity of material introduced and removed. However, since considerable particle growth occurs in the fluidised bed, it is not possible to keep the particular quantity of material present in the fluidised bed constant simply by volumetrically controlling the quantity of material introduced and removed. In a preferred embodiment of the process according to the invention, the quantity of material present in the fluidised bed is regulated in dependence upon a gas pressure measured in the fluidised bed. The reason for this is that it was surprisingly found during the tests on which the present invention is based that a gas pressure measured in the fluidised bed is an extremely precise and reliable measure of the quantity of material present in the fluidised bed, so that the particular quantity of material present in the fluidised bed can be kept constant in dependence upon the gas pressure (by correspondingly controlling either the quantity of material discharged from the fluidised bed, or rather from the cooling zone, or the quantity of material introduced into the fluidised bed, or both quantities). In this connection, the quantity of material present in the fluidised bed is best regulated in dependence upon the difference between a gas pressure measured in the fluidised bed and a gas pressure measured in the exhaust pipe of the fluidised bed because, in this way, any increase in the amount of exhaust given off from the fluidised bed does not have any influence upon the desired valve adjusted.

For optimum operation of the fluidised bed, it has proved to be favourable for about 50% to 90% and preferably about two thirds of the total amount of air delivered to the fluidised bed to be introduced into the fluidised bed from below and for about 10 to 50% and preferably about one third of the air to be introduced from the side.

An adjustable fraction of the exhaust gases from the fluidised bed and preferably an adjustable fraction of the cooling air stream are best delivered to the preheating and precalcination zone, the rest of the exhaust gases from the fluidised bed being removed avoiding the preheating and precalcination zone. Where the raw material used has a particularly high alkali content, it is even possible to remove all the exhaust gases from the fluidised bed avoiding the preheating and precalcination zone and to supply the preheating and precalcination zone solely with cooling air.

One example of an installation for carrying out the process according to the invention is illustrated in the accompanying drawing comprising a diagrammatic, partly vertical sectional view of preferred apparatus.

The installation includes a preheater 1, a precalcination zone 2 and a shaft-like reaction zone 3 with a fluidised bed 4 and a cooling zone 5.

In the preheater 1, which may be formed for example by a multiple-stage cyclone heat exchanger, the powder-form raw material introduced at 6 is preheated in countercurrent by hot gases (arrow 7) and then passes (arrow 8) into the precalcination zone 2 where it is precalcined to a very considerable extent, preferably to a deacidification level of from 80 to 95%, by the hot exhaust gases (arrow 9) from the reaction zone 3 and additional fuel (arrow 10).

The precalcined material is then delivered (arrows 11, 12) to delivery pipes 13, 14 through which it is pneumatically introduced into the fluidised bed 4 (arrows 17) together with fuel 15, 16 at at least two opposite peripheral points.

The internal cross-section of the reaction zone 3 is narrowed in the vicinity of the opening of the delivery pipes 13, 14 and widens conically upwards from this material feed zone. The cross-section of the reaction zone 3 and the air flow rates are gauged in such a way that the intersticial ratio adjusted in the lower region of the fluidised bed intended for the introduction of the precalcined material, i.e. substantially at the level of the delivery pipes 13, 14, is substantially the same as that adjusted in the upper region of the fluidised bed, i.e., preferably between 0.6 and 0.7.

In the fluidised bed 4, the precalcined material is calcined to form cement clinker. After a certain clinker size has been reached, the calcined material passes into the cooling zone 5 to which a stream of cooling air (arrows 19) is delivered from below through the air-permeable base 18.

The cooled material is removed by a rotating discharge unit 20 (arrow 21). Part of the material is recycled into the fluidised bed 4 as seed clinker (arrow 22).

Part of the cooling air stream identified by the arrows 23 is introduced into the fluidised bed 4 from below as aerating and combustion air. Another part (24) is run off laterally through an air extraction pipe at the periphery of the upper region of the cooling zone 5, optionally freed from dust in a cyclone 25 and delivered by a blower 26 to the delivery pipes 13, 14 (arrows 27, 28) as carrier air for the precalcined material (arrows 11, 12) and the fuel (arrows 15, 16).

Another part of this air delivered by the blower 26 may be introduced into the fluidised bed 4 (arrows 29, 30) as an additional side stream, best below the plane of the delivery pipes 13, 14.

Another fraction of the air of the cooling zone 5 delivered by the blower 26 may be delivered as additional combustion air to the precalcination zone 2 (arrow 31). Any excess air (arrow 32) may either be discarded or otherwise used. Similarly, a certain fraction of the exhaust gases from the fluidised bed 4, particularly in the case of a high alkali content, may be branched off (arrow 33) avoiding the precalcination zone 2 and the preheater 1.

For regulating the amount of material present in the fluidised bed 4, the installation contains four pressure-measuring zones 34, 35, 36 and 37, of which the pressure-measuring zone 34 is situated substantially in the region where the material is introduced, the measuring zone 35 at substantially one third to one half the height of the fluidised bed 4, the pressure measuring zone 36 in the upper third of the fluidised bed and the pressure measuring zone 37 in the exhaust gas pipe of the fluidised bed.

The four pressure measuring zones are linked to a known pressure converter 38 which is connected to a known conroller 39. This controller 39 acts on the one hand on the discharge unit 20 (via control line 40) and on the other hand on a material-feed metering unit 41 (via control line 42).

The controller 39 keeps the quantity of material present in the fluidised bed 4 constant. To this end, for example, either the discharge unit 20 controlled by the controller 39 discharges only that quantity of material in excess of the required value from the cooling zone 5 and hence from the fluidised bed 4, or the material-feed metering unit 41 delivers a quantity of material corresponding to the deficit based on the required value. A pressure value supplied by the pressure measuring zones 34 to 37, for example, the difference in the pressures measured at the measuring zones 34 and 37, is used as a measure of the quantity of material present in the fluidised bed 4.

The invention is further illustrated by the following example:

A gas flow rate of approximately 6 m/s and an intersticial ratio (ratio of the empty volume to the total volume of the fluidised bed) of approximately 0.65 is adjusted in the fluidised bed (including its narrowest point in the region of the material and fuel inlet). In the cooling zone, the gas flow rate amounts to approximately 2 m/s and the intersticial ratio to around 0.4 or less.

The seed clinker has a particle size of from 2 to 4 mm, the ratio of raw mix to seed clinker amounting to 4:1.

The preheated and precalcined material is introduced into the fluidised bed 4 at a temperature of approximately 840° C. A temperature of from 1300° to 1350° C. prevails in the fluidised bed 4. In the cooling zone 5, the material is cooled to a temperature of from 80° to 120° C.

The ignition loss of the raw material after the preheater amounts to 5%. The deacidified raw material has a grain size of 44% > 90 and 8.8% > 200.

The quantities of air may be selected as follows:

1.00 $Nm^3$ per kg of clinker are delivered to the cooling zone 5. Of this 1.00 $Nm^3$ of air per kg of clinker, 0.33 $Nm^3$/kg enter the fluidised bed directly from below (arrow 23), whilst 0.67 $Nm^3$/kg are laterally removed from the cooling zone (arrow 24). Of this latter air fraction, 0.17 $Nm^3$/kg enter the fluidised bed 4 from the side as carrier air (arrows 27,28) for the precalcined material and fuel, whilst 0.5 $Nm^3$/kg are directly delivered to the precalcination zone 2 (arrow 31). An equally large volume of air (0.5 $Nm^3$/kg of clinker) enters the precalcination zone 2 (arrow 9) as exhaust from the fluidised bed.

The pressure difference measured between the pressure measuring zones 34 and 37 amounts to between 800 and 1200 mm WC, whilst the pressure difference between the pressure measuring zones 35 and 37 amounts to between 250 and 400 mm WC.

We claim:

1. In a process of producing cement by calcining preheated powder-form raw material in a fluidised bed into which fuel, preheated air, and a recycled fraction of previously calcined raw material are introduced, and cooling material discharged from such bed by a stream of cooling air in a cooling zone, the improvement comprising:
   (a) precalcining said raw material prior to its introduction to said fluidised bed to a deacidification level of at least 40%;
   (b) passing calcined material downwards from the fluidised bed into a packed bed of material forming the cooling zone; and
   (c) introducing part of the cooling air stream into the fluidised bed from below and another part from the side in such proportions as to maintain a substantially constant intersticial ratio between the upper and lower regions of said fluidised bed.

2. A process according to claim 1 wherein the precalcined material is introduced to said fluidised bed from the side thereof.

3. A process according to claim 2 wherein the precalcined material is introduced to said fluidised bed with an impulse of from 5 to 10 kps.

4. A process according to claim 1 wherein said intersticial ratio is between 0.5 and 0.8.

5. A process according to claim 1 including introducing said fuel to said fluidised bed from its side and at a level below its surface.

6. A process according to claim 5 including introducing said precalcined material to said fluidised bed at substantially the level at which said fuel is introduced.

7. A process according to claim 1 including introducing said precalcined material, at least part of said fuel, and said another part of said cooling air stream to said fluidised bed at spaced points about its periphery.

8. A process according to claim 1 wherein gas from said fluidised bed is exhausted through an exhaust pipe, and including regulating the quantity of material present in said fluidised bed with reference to gas pressure in said bed and gas pressure in said exhaust pipe.

9. A process according to claim 1 wherein the proportions of air introduced to said fluidised bed from below and from the side are about 50%–90% and about 10%–50%, respectively.

10. A process according to claim 1 wherein about two-thirds of said air is introduced to said fluidised bed from below and about one-third from the side.

11. A process according to claim 1 including utilising gas exhausted from said fluidised bed in the precalcining of said raw material.

12. A process according to claim 11 including utilising a fraction of said cooling air in the precalcining of said raw material.

13. A process according to claim 1 including precalcining said raw material prior to its introduction to said fluidised bed to a deacidification level of between about 80% and 95%.

14. In a process for producing cement by calcining preheated powder-form raw material in a fluidised bed into which fuel, preheated air, and a recycled fraction of previously calcined raw material are introduced, and cooling material discharged from such bed by a stream of cooling air in a cooling zone, the improvement comprising:
   (a) precalcining said raw material prior to its introduction to said fluidised bed to a deacidification level of between about 80% and 95%;
   (b) passing calcined material downwards from the fluidised bed into a packed bed of material immediately below and in contact with the fluidised bed and forming the cooling zone;
   (c) introducing part of the cooling air stream into the fluidised bed from below and another part from the side; and
   (d) regulating the quantities of cooling air introduced into the fluidised bed from below and from the side to maintain a substantially constant intersticial ratio between the upper and lower regions of said fluidised bed.

15. A process according to claim 14 wherein said calcined material is introduced to said fluidised bed with an impulse of from 5 to 10 kps.

16. A process according to claim 14 wherein said intersticial ratio is between 0.5 and 0.8.

17. A process according to claim 14 wherein said intersticial ratio is between 0.6 and 0.7.

* * * * *